US010922589B2

(12) United States Patent
Sargent et al.

(10) Patent No.: US 10,922,589 B2
(45) Date of Patent: Feb. 16, 2021

(54) OBJECT-BASED CONVOLUTIONAL NEURAL NETWORK FOR LAND USE CLASSIFICATION

(71) Applicant: Ordnance Survey Limited, Southampton (GB)

(72) Inventors: Isabel Sargent, Southampton (GB); Ce Zhang, Lancaster (GB); Peter M. Atkinson, Lancaster (GB)

(73) Assignee: Ordnance Survey Limited, Southampton (GB)

( * ) Notice: Subject to any disclaimer, the term of this patent is extended or adjusted under 35 U.S.C. 154(b) by 240 days.

(21) Appl. No.: 16/156,044

(22) Filed: Oct. 10, 2018

(65) Prior Publication Data
US 2020/0117959 A1    Apr. 16, 2020

(51) Int. Cl.
*G06K 9/68* (2006.01)
*G06T 7/10* (2017.01)
(Continued)

(52) U.S. Cl.
CPC ......... *G06K 9/685* (2013.01); *G06K 9/00651* (2013.01); *G06K 9/6262* (2013.01); *G06T 7/10* (2017.01)

(58) Field of Classification Search
CPC .. G06K 9/685; G06K 9/00651; G06K 9/6262; G06K 9/6273; G06K 9/6292;
(Continued)

(56) References Cited

U.S. PATENT DOCUMENTS 9,619,734 B2    4/2017  Marchisio et al.
2018/0089505 A1*   3/2018  El-Khamy ............... G06T 7/73
(Continued)

FOREIGN PATENT DOCUMENTS

CN    103489005 A    1/2014

OTHER PUBLICATIONS

Zhang et al., "An Object-based Convolutional Neural Network (OCNN) for Urban Land Use Classification", Remote Sensing Environment 216 (2018) 57-70 (Year: 2018).*
(Continued)

*Primary Examiner* — Mazda Sabouri
(74) *Attorney, Agent, or Firm* — Banner & Witcoff, Ltd.

(57) ABSTRACT

An object-based convolutional neural network (OCNN) method and system for urban land use classification from VFSR imagery are described. In the OCNN, segmented objects consisting of linearly shaped objects (LS-objects) and other general objects (G-objects), are utilized as functional units. The G-objects are precisely identified and labelled through a single large input window (128×128) CNN with a deep (eight-layer) network to perform a contextual object-based classification. Whereas the LS-objects are each distinguished accurately using a range of small input window (48×48) CNNs with less deep (six-layer) networks along the objects' lengths through majority voting. The locations of the input image patches for both CNN networks are determined by considering both object geometry and its spatial anisotropy, such as to accurately classify the objects into urban land use classes.

20 Claims, 11 Drawing Sheets
(9 of 11 Drawing Sheet(s) Filed in Color)

(51) Int. Cl.
*G06K 9/00* (2006.01)
*G06K 9/62* (2006.01)

(58) Field of Classification Search
CPC .... G06K 9/4628; G06K 9/00637; G06T 7/10; G06T 2207/20084; G06T 2207/20081; G06T 2207/10036; G06T 2207/10028; G06T 2207/30184; G06T 7/11; G06N 3/084; G06N 3/0454
See application file for complete search history.

(56) References Cited

U.S. PATENT DOCUMENTS

| | | | |
|---|---|---|---|
| 2019/0228529 A1* | 7/2019 | Sun | G06K 9/6256 |
| 2020/0143194 A1* | 5/2020 | Hou | G06K 9/46 |
| 2020/0143205 A1* | 5/2020 | Yao | G06K 9/6262 |

OTHER PUBLICATIONS

May 2, 2019—(EP) Extended Search Report—App 18200732.8.
Zhang, et al., "A hybrid NLP-CNN classifier for very fine resolution remotely sensed image calssification" ISPRS Journal of Photogrammertry and Remote Sensing 140, (2018) pp. 133-144.
Zhang, et al., "An Object-based Convolutional Neural Network (OCNN) for Urban Land Use Classification," Remote Sensing of Environment 216 (2018) 57-70.
Zhang, et al., "Integrating Bottom-Up Classification and Top-Down Feedback for Improving Urban Land-Cover and Functional-Zone Mapping," Remote Sensing of Enviornment 212 (2018) 231-248.

* cited by examiner

| Class | MRF | OBIA-SVM | Pixel-wise CNN | OCNN$_{48}$ | OCNN$_{48}*$ | OCNN$_{128}$ | OCNN$_{128+48}*$ |
|---|---|---|---|---|---|---|---|
| commercial | 71.11 | 72.47 | 74.16 | 76.27 | 82.43 | 82.72 |
| highway | 80.43 | 79.26 | 80.59 | 82.57 | 79.01 | 84.37 |
| industrial | 73.52 | 72.05 | 74.84 | 76.22 | 82.19 | 83.26 |
| residential | 78.41 | 80.45 | 80.56 | 83.09 | 84.75 | 84.99 |
| parking lot | 79.63 | 82.06 | 84.37 | 87.86 | 89.74 | 92.02 |
| railway | 85.94 | 88.14 | 88.32 | 91.06 | 88.42 | 91.48 |
| park and recreational area | 88.42 | 89.54 | 90.76 | 91.34 | 94.38 | 94.59 |
| redeveloped area | 82.07 | 84.15 | 87.04 | 88.83 | 93.16 | 93.75 |
| canal | 90.02 | 92.28 | 94.18 | 97.52 | 95.26 | 98.74 |
| Overall Accuracy (OA) | 78.52% | 80.37% | 82.39% | 85.06% | 88.74% | 90.87% |
| Kappa Coefficient ($\kappa$) | 0.76 | 0.79 | 0.81 | 0.83 | 0.86 | 0.88 |

FIGURE 12

OBJECT-BASED CONVOLUTIONAL NEURAL NETWORK FOR LAND USE CLASSIFICATION

FIELD

Aspects described herein relate to a method and system that uses an object-based convolutional neural network to determine land use classifications from remotely sensed image data of the land.

BACKGROUND

Urban land use information, reflecting socio-economic functions or activities, is essential for urban planning and management. It also provides a key input to urban and transportation models, and is essential to understanding the complex interactions between human activities and environmental change. With the rapid development of modern remote sensing technologies, a huge amount of very fine spatial resolution (VFSR) remotely sensed imagery is now commercially available, opening new opportunities to extract urban land use information at a very detailed level. However, urban land features captured by these VFSR images are highly complex and heterogeneous, comprising the juxtaposition of a mixture of anthropogenic urban and semi-natural surfaces. Often, the same urban land use types (e.g. residential areas) are characterised by distinctive physical properties or land cover materials (e.g. composed of different roof tiles), and different land use categories may exhibit the same or similar reflectance spectra and textures (e.g. asphalt roads and parking lots). Meanwhile, information on urban land use within VFSR imagery is presented implicitly as patterns or high level semantic functions, in which some identical low-level ground features or object classes are frequently shared amongst different land use categories. This complexity and diversity of spatial and structural patterns in urban areas makes its classification into land use classes a challenging task (Hu et al., 2015). Therefore, it is important to develop robust and accurate urban land use classification techniques by effectively representing the spatial patterns or structures lying in VFSR remotely sensed data.

SUMMARY

Urban land use information is essential for a variety of urban-related applications such as urban planning and regional administration. The extraction of urban land use from very fine spatial resolution (VFSR) remotely sensed imagery has, therefore, drawn much attention in the remote sensing community. Nevertheless, classifying urban land use from VFSR images remains a challenging task, due to the extreme difficulties in differentiating complex spatial patterns to derive high-level semantic labels. Deep convolutional neural networks (CNNs) offer great potential to extract high-level spatial features, thanks to its hierarchical nature with multiple levels of abstraction. However, blurred object boundaries and geometric distortion, as well as huge computational redundancy, severely restrict the potential application of CNN for the classification of urban land use. Herein an object-based convolutional neural network (OCNN) is described for urban land use classification using VFSR images. Rather than Pixel-wise convolutional processes, the OCNN relies on segmented objects as its functional units, and CNN networks are used to analyse and label objects such as to partition within-object and between-object variation. Two CNN networks with different model structures and window sizes are developed to predict linearly shaped objects (e.g. Highway, Canal) and general (other non-linearly shaped) objects. Then a rule-based decision fusion is performed to integrate the class-specific classification results. The effectiveness of the proposed OCNN method was tested on aerial photography of two large urban scenes in Southampton and Manchester in Great Britain. The OCNN combined with large and small window sizes achieved excellent classification accuracy and computational efficiency, consistently outperforming its sub-modules, as well as other benchmark comparators, including the Pixel-wise CNN, contextual-based MRF and object-based OBIA-SVM methods. The method provides the first object-based CNN framework to effectively and efficiently address the complicated problem of urban land use classification from VFSR images.

In view of the above, a first aspect of the present disclosure relates to a computer implemented method of classifying land use from remotely sensed imagery of land, comprising: receiving an input image of a patch of land, the land uses of which are to be determined; segmenting the input image into linearly shaped objects and non-linearly shaped objects; inputting the linearly shaped objects and non-linearly shaped objects into a first convolutional neural network trained with test images of predetermined land use types, and having a processing window size of a first size; inputting the linearly shaped objects and non-linearly shaped objects into a second convolutional neural network trained with test images of predetermined land use types, and having a plurality of processing windows of a second size smaller than the first size; determining land use classification data for the objects in both the first and second convolutional neural networks; receiving the land use classification data for the linearly shaped objects and the non-linearly shaped objects from both the first and second convolutional neural networks; and selecting a land use classification for a particular object from the land use classifications received from both the first and second convolutional neural networks in dependence on one or more predetermined classification fusion rules.

Also described herein, a second aspect of the disclosure includes a computer system, comprising: one or more processors; an input and output interface for receiving data and outputting data; and a computer readable medium storing one or more computer programs so arranged such that when executed they cause the computer system to determine land use from remotely sensed imagery of land, the determining comprising: receiving an input image of a patch of land the uses of which are to be determined; segmenting the input image into linearly shaped objects and non-linearly shaped objects; inputting the linearly shaped objects and non-linearly shaped objects into a first convolutional neural network trained with test images of predetermined land use types, and having a processing window size of a first size; inputting the linearly shaped objects and non-linearly shaped objects into a second convolutional neural network trained with test images of predetermined land use types, and having a plurality of processing windows of a second size smaller than the first size; determining land use classification data for the objects in both the first and second convolutional neural networks; receiving the land use classification data for the linearly shaped objects and the non-linearly shaped objects from both the first and second convolutional neural networks; and selecting a land use classification for a particular object from the land use classifications received from both the first and second convolutional neural networks in dependence on one or more predetermined classification fusion rules.

Further features, examples, and advantages of the present disclosure will be apparent from the following description and from the appended claims.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Examples of the present disclosure will now be described with reference to the accompanying drawings, wherein like reference numerals refer to like parts, and wherein:

FIG. 12 is a table comparing land use classification accuracy of illustrative embodiments of the present disclosure against other known classification techniques.

DETAILED DESCRIPTION

Figure 1:
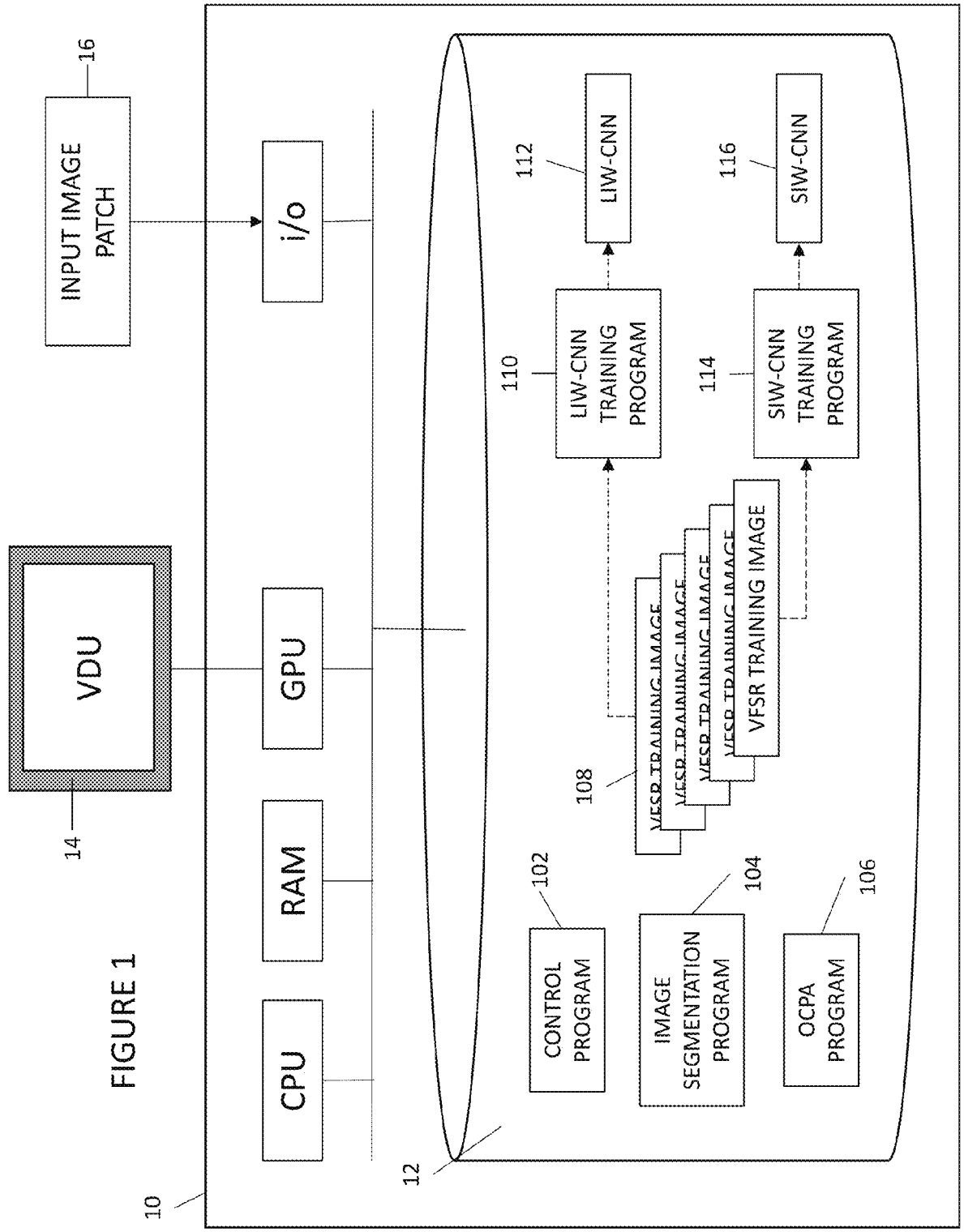
FIG. 1 is a block diagram of a computer system according to one or more illustrative aspects of the present disclosure.

Urban land use classification using VFSR remotely sensed imagery remains a challenging task, due to the indirect relationship between the desired high-level land use categories and the recorded spectral reflectance. A precise partition of functional units as image objects together with an accurate and robust representation of spatial context are, therefore, needed to characterise urban land use structures and patterns into high-level feature thematic maps. Herein we describe a novel object-based CNN (OCNN) method for urban land use classification from VFSR imagery. In the OCNN, segmented objects consisting of linearly shaped objects (LS-objects) and other general objects (G-objects), are utilized as functional units. The G-objects are precisely identified and labelled through a single large input window (128×128) CNN with a deep (eight-layer) network to perform a contextual object-based classification. Whereas the LS-objects are each distinguished accurately using a range of small input window (48×48) CNNs with less deep (six-layer) networks along the objects' lengths through majority voting. The locations of the input image patches for both CNN networks are determined by considering both object geometry and its spatial anisotropy, such as to accurately classify the objects into urban land use classes. Experimental results on two distinctive urban scenes demonstrate that the proposed OCNN method significantly increases the urban land use classification accuracy for all land use categories. The described OCNN method with large and small window size CNNs produces the most accurate classification results in comparison with the sub-modules and other contextual-based and object-based benchmark methods. Moreover, the OCNN method demonstrates a high computational efficiency with much more acceptable time requirements than the standard pixel-wise CNN method in the process of model inference. We conclude that the proposed OCNN is an effective and efficient method for urban land use classification from VFSR imagery. Meanwhile, the OCNN method exhibits an excellent generalisation capability on distinctive urban land use settings with great potential for a broad range of applications.

In slightly more detail, herein we describe an innovative object-based CNN (OCNN) method to address the complex urban land-use classification task using VFSR imagery. Specifically, object-based segmentation is initially employed to characterise the urban landscape into functional units, which consist of two geometrically different objects, namely linearly shaped objects (e.g. Highway, Railway, Canal) and other (non-linearly shaped) general objects. Two CNNs with different model structures and window sizes are then applied to analyse and label these two kinds of objects, and a rule-based decision fusion is undertaken to integrate the models for urban land use classification. The innovations of this approach can be summarised as 1) to develop and exploit the role of CNNs under the framework of OBIA, where both within-object information and between-object information is used jointly to fully characterise objects and their spatial context, and 2) to design the CNN networks and position them appropriately with respect to object size and geometry, and integrate the models in a class-specific manner to obtain an effective and efficient urban land use classification output (i.e., a thematic map image). The effectiveness and the computational efficiency of the proposed method were tested on two complex urban scenes in Great Britain. Further details of the embodiments will now be described with respect to the Figures.

FIG. 1 is a block diagram of a typical general purpose computer system 10 that can form the processing platform for the OCNN processing to be described. The computer system 10 comprises a central processing unit (CPU), random access memory (RAM), and graphics processing unit (GPU) as is well known in the art, and also has input and output ports into which data can be received and output therefrom. Additionally included is a video display unit such as a computer monitor or the like, which receives images to be displayed via the graphics card (GPU).

Figure 4:
FIG. 4 are example training image patches used by an illustrative embodiment.

The computer system 10 also includes some non-volatile storage 12, such as a hard disk drive, solid-state drive, or NVMe drive. Stored on the non-volatile storage 12 is a number of executable computer programs together with data and data structures required for their operation. Overall control of the system 10 is undertaken by the control program 102, which operates in an over-arching control mode to run the other programs and functions to be described to perform the task of land use classification performed by various illustrative embodiments described herein. The other programs and data include an image segmentation program 104, an object convolutional position analysis (OCPA) program 106, a large-input window convolutional neural network (LIW-CNN) training program 110, and a small-input window convolutional neural network (SIW-CNN) training program 114. Also included are data structures corresponding to the LIW-CNN 112, and the SIW-CNN 116 themselves, as well as set of very fine spatial resolution (VFSR) training images 108, which are used by the CNN training programs 110 and 114 to train the CNNs 112 and 116. An example set of training images for different land use types is shown in FIG. 4, taken from two different study sites S1, and S2.

Input into the computer system 10 for processing thereby are image patches 16, which are land images which each represent a discrete geographical area which is required to be analysed autonomously by the system, and the land use of the geographical area shown in the patch determined. In order to cover a larger geographic area several different image patches covering the extent of the area for which the use is to be determined can be input, sequentially. The sequentially input land patch images may be contiguous geographic areas.

Figure 2:
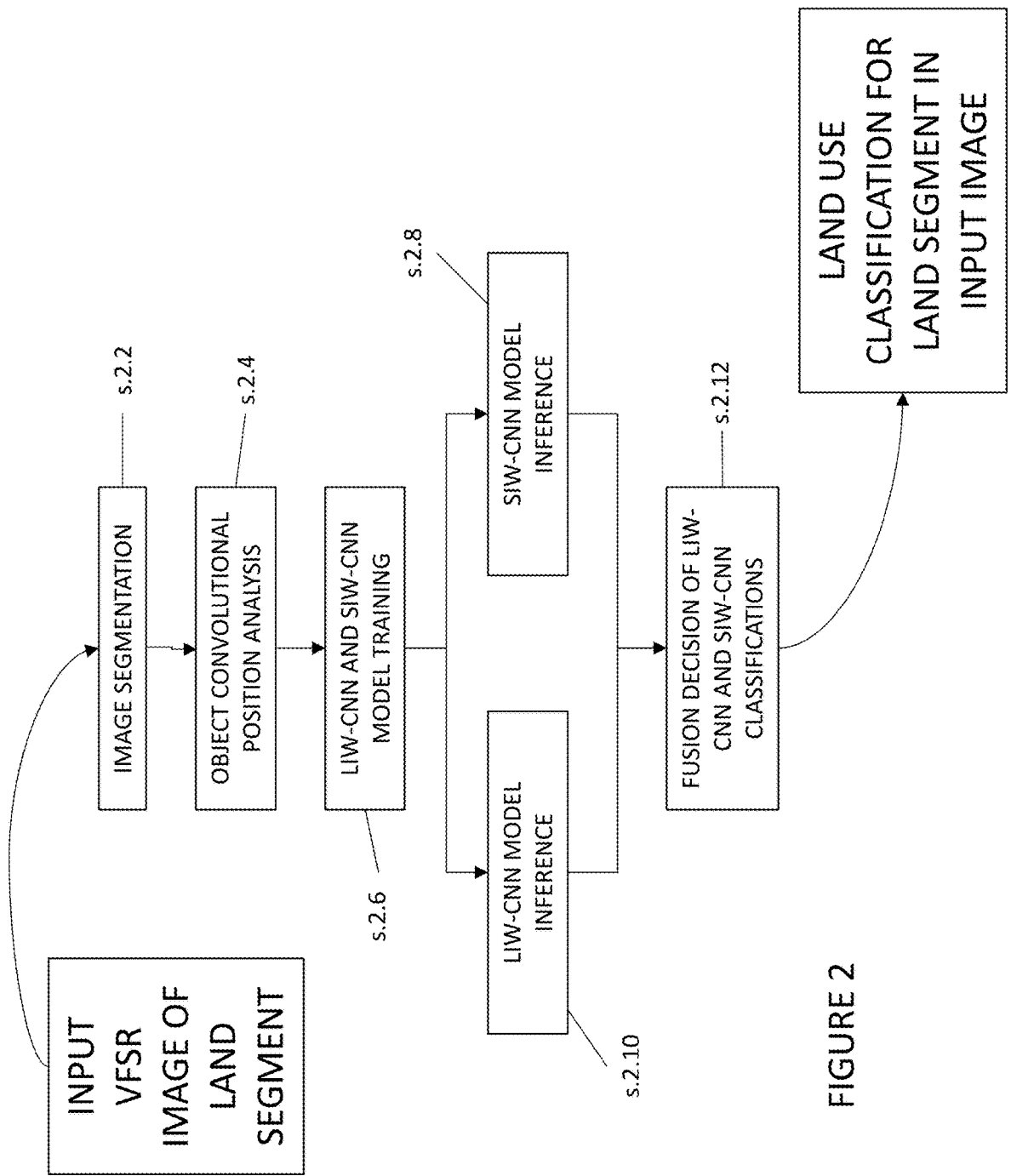
FIG. 2 is a flow diagram of the operation of a computer system according to one or more illustrative aspects of the present disclosure.

With the above architecture, the overall operation of the system is shown in FIG. 2. The system makes use of two separate convolutional neural networks. A Convolutional Neural Network (CNN) is a multi-layer feed-forward neural network that is designed specifically to process large scale images or sensory data in the form of multiple arrays by considering local and global stationary properties. The main building block of a CNN is typically composed of multiple layers interconnected to each other through a set of learnable weights and biases. Each of the layers is fed by small patches of the image that scan across the entire image to capture different characteristics of features at local and global scales. Those image patches are generalized through alternative convolutional and pooling/subsampling layers within the CNN framework, until the high-level features are obtained on which a fully connected classification is performed. Additionally, several feature maps may exist in each convolutional layer and the weights of the convolutional nodes in the same map are shared. This setting enables the network to learn different features while keeping the number of parameters tractable. Moreover, a nonlinear activation (e.g. sigmoid, hyperbolic tangent, rectified linear units) function is taken outside the convolutional layer to strengthen the non-linearity. Specifically, the major operations performed in the CNN can be summarised as:

$$O^l = \underset{p}{pool}(\sigma(O^{l-1} * W^l + b^l)) \quad (1)$$

where the $O^{l-1}$ denotes the input feature map to the lth layer, the $W^l$ and the $b^l$ represent the weights and biases of the layer, respectively, that convolve the input feature map through linear convolution*, and the σ(•) indicates the non-linearity function outside the convolutional layer. These are often followed by a max-pooling operation with p×p window size ($pool_p$) to aggregate the statistics of the features within specific regions, which forms the output feature map $O^l$ at the lth layer.

Figure 3:
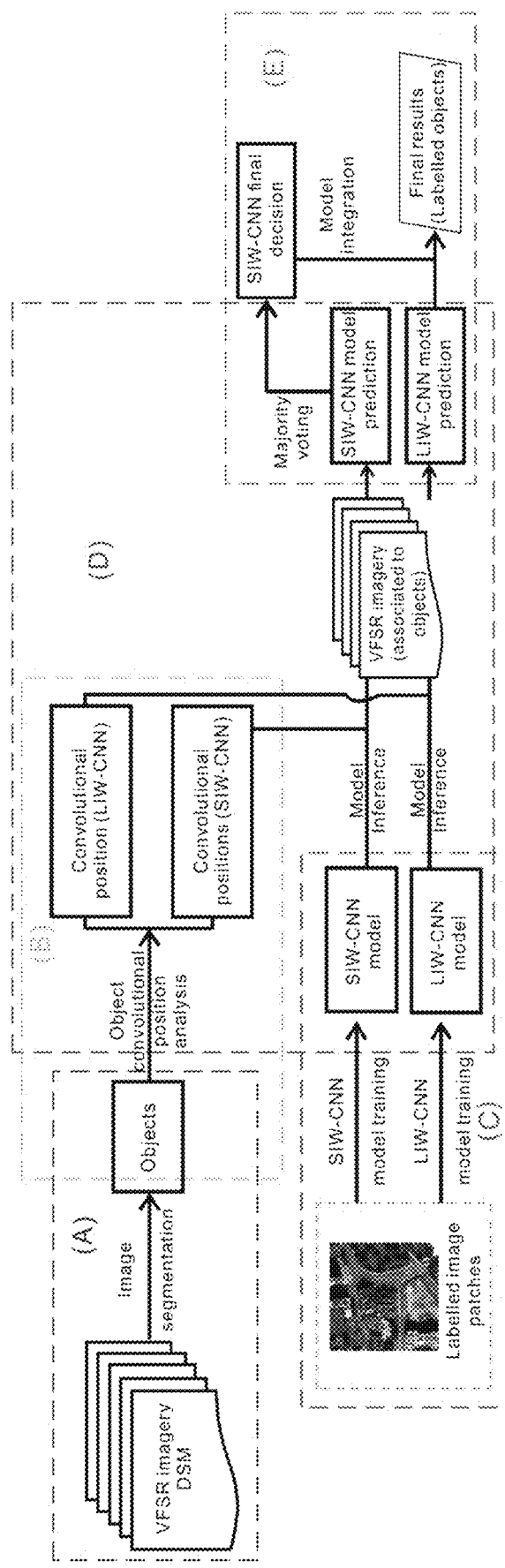
FIG. 3 is block diagram of the operation of an illustrative embodiment of the present disclosure.

An object-based CNN (OCNN) is used for the urban land use classification using VFSR remotely sensed imagery of the present embodiment. The OCNN is trained as the standard CNN models with labelled image patches, whereas the model prediction is to label each segmented object derived from image segmentation. The segmented objects are generally composed of two distinctive objects in geometry, including linearly shaped objects (LS-objects) (e.g. Highway, Railway and Canal) and other (nonlinearly shaped) general objects (G-objects). To accurately predict the land use membership association of a G-object, a large spatial context (i.e. a large image patch) is required when using the CNN model. Such a large image patch, however, often may lead to a large uncertainty in the prediction of LS-objects due to narrow linear features being ignored throughout the convolutional process. Thus, a large input window CNN (LIW-CNN) and a range of small input window CNNs (SIW-CNN) were trained to predict the G-object and the LS-object, respectively, where the appropriate convolutional positions of both models were derived from a novel object convolutional position analysis (OCPA). The final classification results were determined by the decision fusion of the LIW-CNN and the SIW-CNN. As illustrated by FIGS. 2 and 3, the general workflow of the proposed OCNN consists of five major steps, including (A) image segmentation (s.2.2), (B) OCPA (s.2.4), (C) LIW-CNN and SIWCNN model training (s.2.6), (D) LIW-CNN and SIW-CNN model inference (steps 2.10 and 2.8 respectively), and (E) Decision fusion of LIW-CNN and SIW-CNN (s.2.12). Each of these steps is elaborated on further below.

The proposed method starts with an initial image segmentation to achieve an object-based image representation. Mean-shift segmentation, as a nonparametric clustering approach, was used to partition the image into objects with homogeneous spectral and spatial information. Four multi-spectral bands (Red, Green, Blue, and Near Infrared) together with a digital surface model (DSM), useful for differentiating urban objects with height information, were incorporated as multiple input data sources for the image segmentation (FIG. 3A)). A slight over-segmentation rather than under-segmentation was produced to highlight the importance of spectral similarity, and all the image objects were transformed into GIS vector polygons with distinctive geometric shapes.

Following image segmentation is an object convolutional position analysis (OCPA) step (see FIG. 3(B)). The OCPA step is based on the moment bounding (MB) box of each object to identify the position of LIW-CNN and those of SIW-CNNs. The MB box refers to the minimum bounding rectangle built upon the moment orientation (the orientation of the major axis) of a polygon (i.e. an object), derived from planar characteristics defined by mechanics. The MB box theory is briefly described hereafter. Suppose that (x, y) is a point within a planar polygon (S) (FIG. 5), whose centroid is C (x, y). The moment of inertia about the x-axis (Ixx) and y-axis (Iyy), and the product of inertia (Ixy) are expressed by Eqs. (2), (3) and (4), respectively.

$$I_{xx} = \int y^2 dA \quad (2)$$

$$I_{yy} = \int x^2 dA \quad (3)$$

$$I_{xy} = \int xy dA \quad (4)$$

Figure 5:
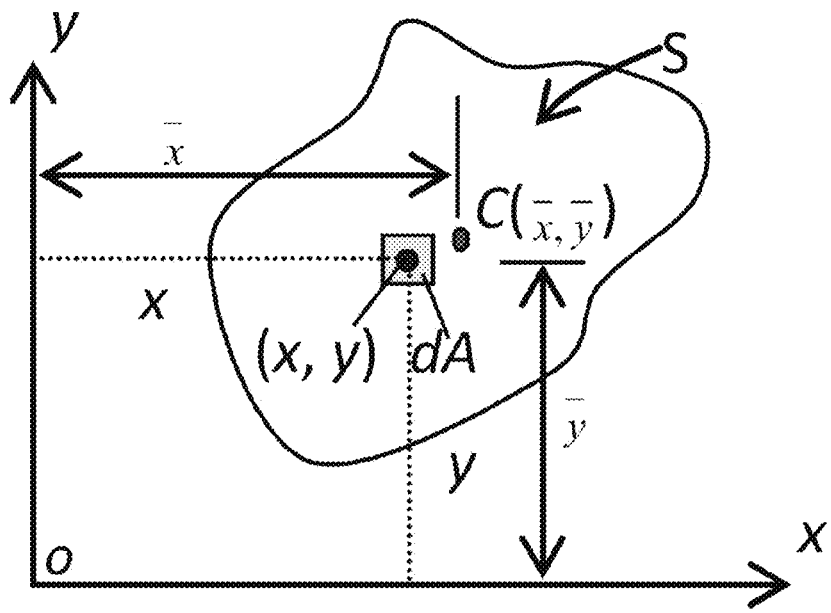
FIG. 5 is a graph showing the calculation of an object parameter used in an illustrative embodiment.
Figure 6:
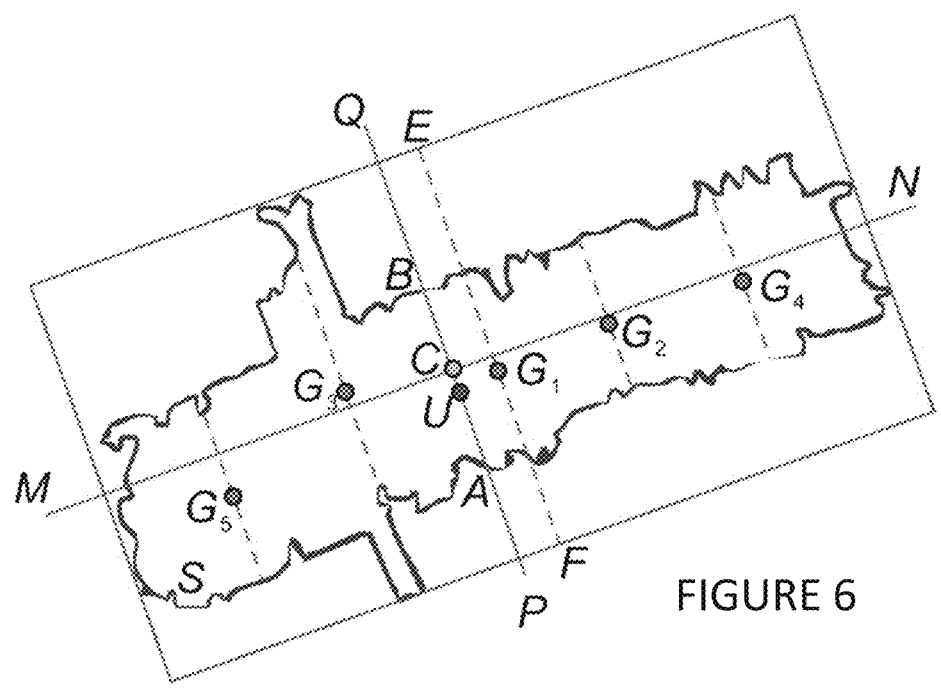
FIG. 6 is a diagram illustrating an object bounding box used in an illustrative embodiment.

Note, dA(=dx·dy) refers to the differential area of point (x, y). As illustrated by FIG. 5, two orthogonal axes (MN and PQ), the major and minor axes, pass through the centroid (C), with the minimum and maximum moment of inertia about the major and minor axes, respectively. The moment orientation $\theta_{MB}$ (i.e. the orientation of the major axis) is calculated by Eqs. (5) and (6).

$$\tan 2\theta_{MB} = \frac{2I_{xy}}{I_{yy} - I_{xx}} \quad (5)$$

$$\theta_{MB} = \frac{1}{2}\tan^{-1}\left(\frac{2I_{xy}}{I_{yy} - I_{xx}}\right) \quad (6)$$

The moment bounding (MB) box (the rectangle in red shown in FIG. 3) that minimally encloses the polygon, S, is then constructed by taking θMBas the orientation of the long side of the box, and EF is the perpendicular bisector of the MB box with respect to its long side. The discrete forms of Eqs. (2)-(6) suitable for patch computation, are further deduced by associating the value of a line integral to that of a double integral using Green's theorem. The CNN convolutional positions are determined by the minor axis (PQ) and the bisector of the MB box (EF) to approximate the central region of the polygon (S). For the LIW-CNN, the central point (the red point U) of the line segment (AB) intersected by PQ and polygon S is assigned as the convolutional position. As for the SIW-CNN, a distance parameter (d) (a user defined constant) is used to determine the number of SIW-CNN sampled along the polygon. Given the length of a MB box as l, the number (n) of SIW-CNNs is derived as:

$$n = \frac{l-d}{d} \quad (7)$$

The convolutional positions of the SIW-CNN are assigned to the intersection between the centre of the bisector (EF) as well as its parallel lines and the polygon S. The points (G1, G2, . . . , G5) in FIG. 5 illustrate the convolutional positions of SIW-CNN for the case of n=5.

Once the OCPA has been undertaken, both the LIW-CNN and SIW-CNN are trained using image patches with labels as input feature maps (s.2.6 in FIG. 2, part C of FIG. 3). The parameters and model structures of these two models may be empirically tuned as will be described later. Those trained CNN models are then used for model inference in the next stage.

After the above steps, the trained LIW-CNN and SIW-CNN models, and the convolutional position of LIW-CNN and those of SIW-CNN for each object are available. For a specific object, its land use category can be predicted by the LIW-CNN at the derived convolutional position within the VFSR imagery; at the same time, the predictions on the land use membership associations of the object can also be obtained by employing SIW-CNN models at the corresponding convolutional positions. Thus each object is predicted by both LIW-CNN and SIW-CNN models (steps 2.8 and 2.10 in FIG. 2, and part D of FIG. 3).

The final stage is to fuse the two LIW-CNN and SIW-CNN model predictions together. Given an object, the two LIW-CNN and SIW-CNN model predictions might be inconsistent between each other, and the distinction might also occur within those of the SIW-CNN models. Therefore, a simple majority voting strategy is applied to achieve the final decision of the SIW-CNN model. A fusion decision between the LIW-CNN and the SIWCNN is then conducted to give priority to the SIW-CNN model for LS objects, such as roads, railways etc.; otherwise, the prediction of the LIW-CNN is chosen as the final result.

Having described the overall method, brief discussion will now be undertaken of various parameter settings that can be altered in the processing of each of the stages.

Following this, example land use classification results obtained by the described method and system will be discussed.

With respect to segmentation parameter settings, the initial mean-shift segmentation algorithm was implemented using the Orfeo Toolbox open-source software. Two spatial and spectral bandwidth parameters, namely the spatial radius and the range (spectral) radius, were optimized as 15.5 and 20 through cross-validation coupled with a small amount of trial-and-error. In addition, the minimum region size (the scale parameter) was chosen as 80 to produce a small amount of over-segmentation and, thereby, mitigate salt and pepper effects simultaneously.

Figure 7:
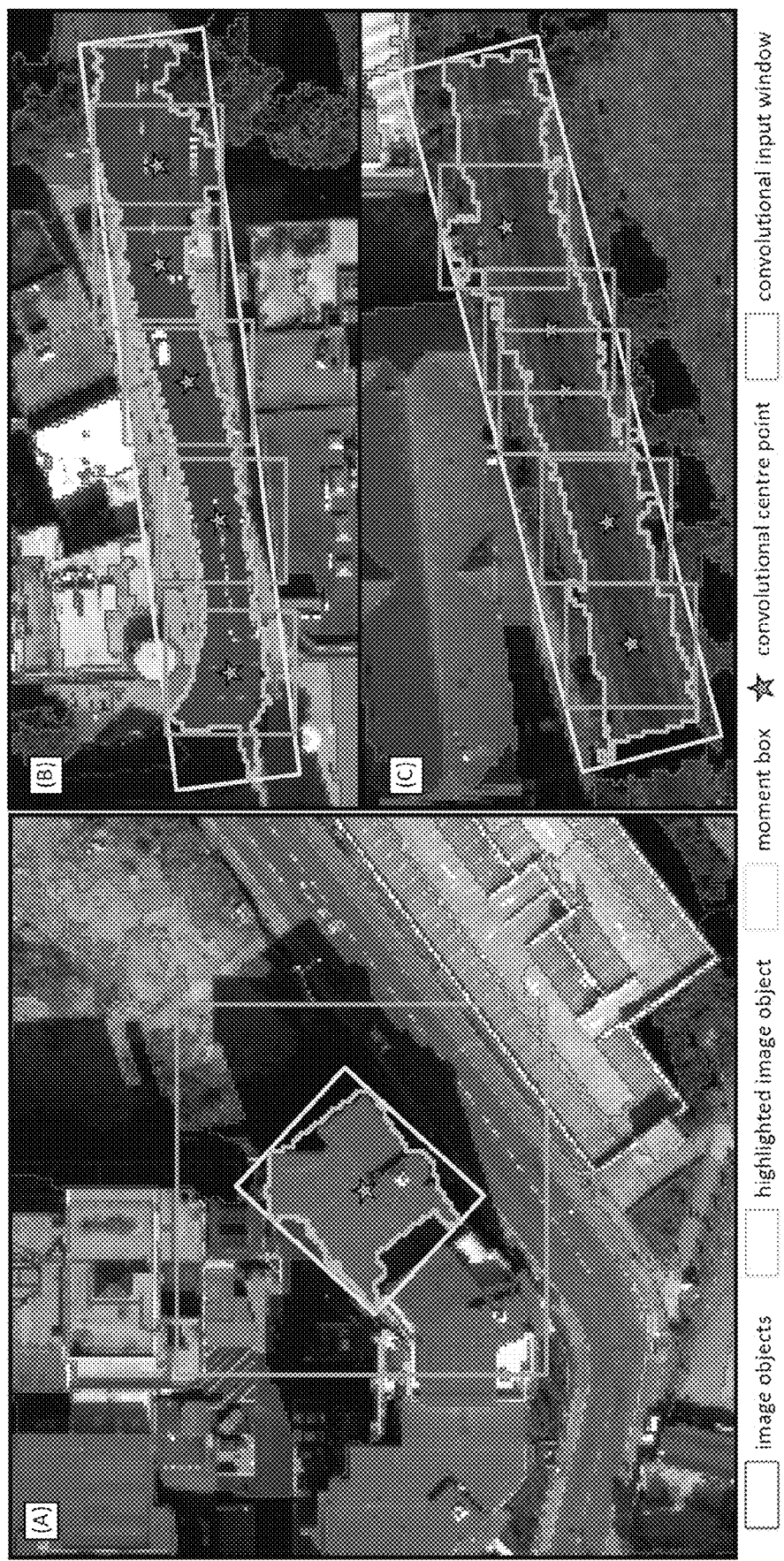
FIG. 7 are example image patches annotated with object segmentations used in an illustrative embodiment.
Figure 8:
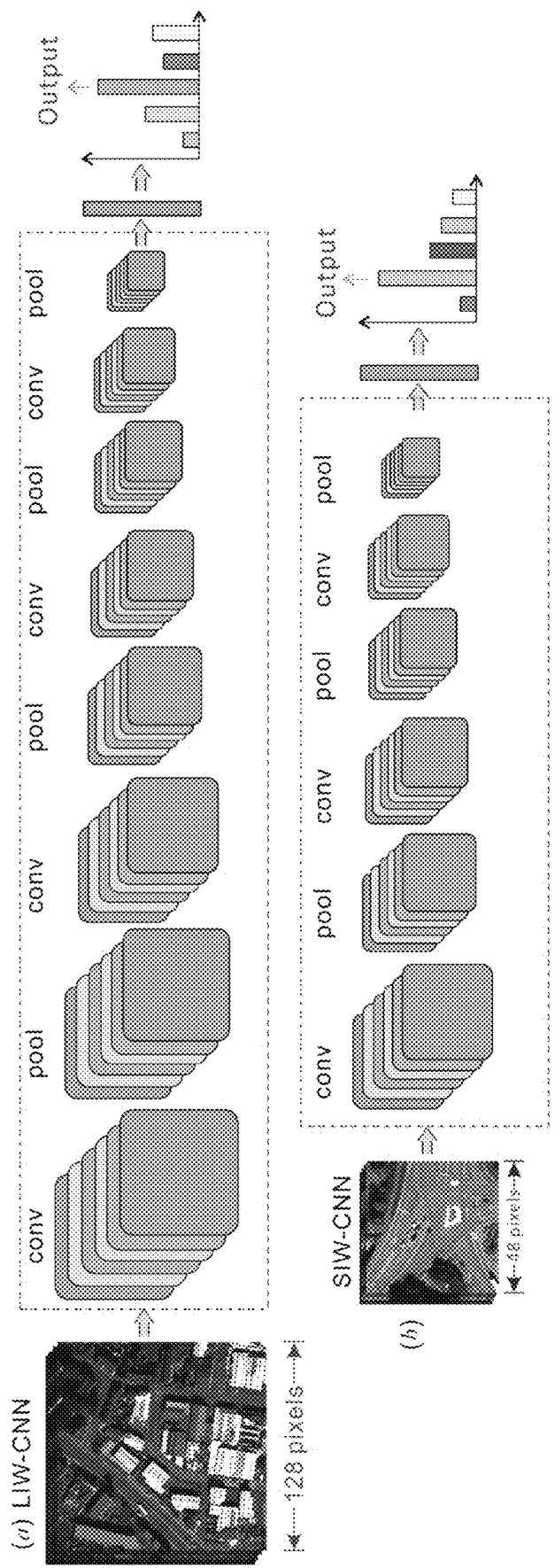
FIG. 8 is a diagram showing the operation of a neural network in an illustrative embodiment.

Turning now to the LIW-CNN and SIW-CNN model structures and parameters, within the two study sites, the highway, railway in S1 and the highway, railway, and canal in S2 belong to linearly shaped objects (LS-objects) in consideration of the elongated geometric characteristics (e.g. FIG. 7(B), (C)), while all the other objects belong to general objects (G-objects) (e.g. FIG. 7(A)). The LIW-CNN with a large input window (FIG. 7(A)), and SIW-CNNs with small input windows (FIG. 7(B), (C)) that are suitable for the prediction of G-objects and LS-objects, respectively, were designed here. Note, the other type of CNN models employed on each object, namely, the SIW-CNNs in FIG. 8(A) and the LIW-CNN in both FIG. 8(B) and (C) were not presented in the figure to gain a better visual effect. The model structures and parameters of LIWCNN and SIW-CNN are illustrated by FIGS. 8(a) and (b) and are detailed hereafter. The model structure of the LIW-CNN was designed similar to the AlexNet (Krizhevsky et al., 2012) with eight layers (FIG. 8(a)) using a large input window size (128×128), but with small convolutional filters (3×3) for the majority of layers except for the first one (which was 5×5). The input window size was determined through cross-validation on a range of window sizes, including {48×48, 64×64, 80×80, 96×96, 112×112, 128×128, 144×144, 160× 160} to sufficiently cover the contextual information of general objects relevant to land use semantics. The number of filters was tuned to 64 to extract deep convolutional features effectively at each level. The CNN network involved alternating convolutional (cony) and pooling layers (pool) as shown in FIG. 8(a), where the maximum pooling within a 2×2 window was used to generalize the feature and keep the parameters tractable. The SIW-CNN (FIG. 8(b)) with a small input window size (48×48) and six-layer depth is a simplified structure with similar parameters to the LIW-CNN network, except for the number of convolutional filters at each layer, which was reduced to 32 in order to avoid over-fitting the model. The input window size was cross-validated on linear objects with a range of small window sizes, including {24×24, 32×32, 40×40, 48×48, 56×56, 64×64, 72×72}, and 48×48 was found to be optimal to capture the contextual information about land use for linear objects. All the other parameters for both CNN networks were optimized empirically based on standard computer vision. For example, the number of neurons for the fully connected layers was set as 24, and the output labels were predicted through soft-max estimation with the same number of land use categories. The learning rate and the epoch were set as 0.01 and 600 to learn the deep features through backpropagation.

With respect to the OCNN parameter settings, in the proposed OCNN method, the LIW-CNN and the SIW-CNN networks were integrated to predict the land use classes of general objects and linearly shaped objects at the model inference phase. Based on object convolutional position analysis (OCPA), the LIW-CNN with a 128×128 input window (denoted as OCNN128) was employed only once per object, and the SIW-CNNs with a 48×48 input window (denoted as $OCNN_{48*}$, the 48* here represents multiple image patches sized 48×48) were used at multiple positions to predict the land use label of an object through majority voting. The parallel distance parameter d in OCPA that controls the convolutional locations and the number of small window size CNNs, was estimated by the length distribution of the moment box together with a trial-and-error procedure in a wide search space (0.5 m-20 m) with a step of 0.5 m. The d was optimized as 5 m for the objects with moment box length (l) larger than or equal to 20 m, and was estimated by ¼ for those objects with l less than 20 m (i.e. the minimum number of small window size CNNs was 3) to perform a statistical majority voting. The proposed method of the present embodiment (OCNN128+48*) integrates both OCNN128 and OCNN48*, which is suitable for the prediction of urban land use semantics for any shaped objects.

Figure 9:
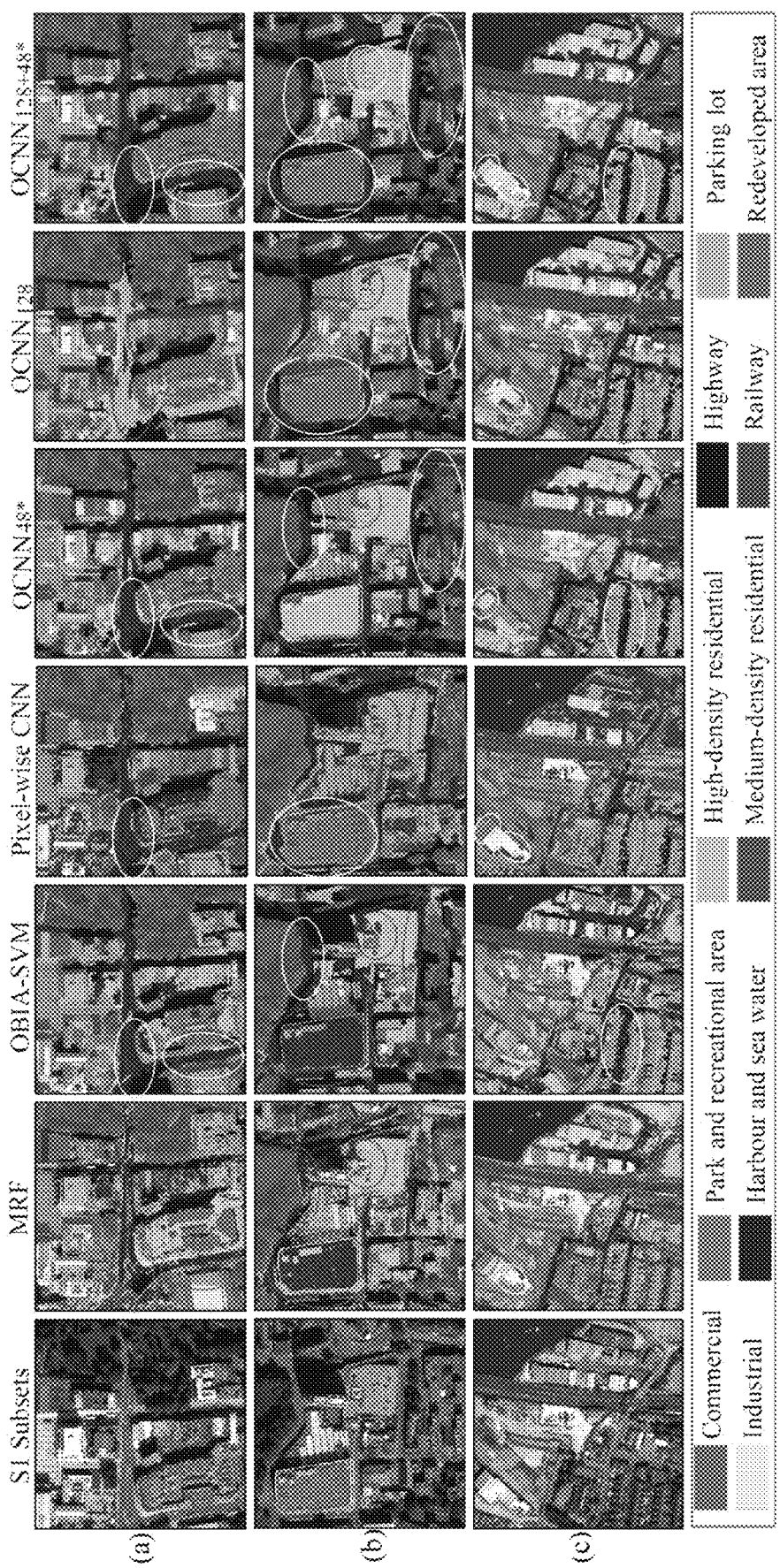
FIGS. 9 and 10 are example output image patches showing example land use classifications for objects using a predetermined color coding according to one or more illustrative aspects described herein.
Figure 10:
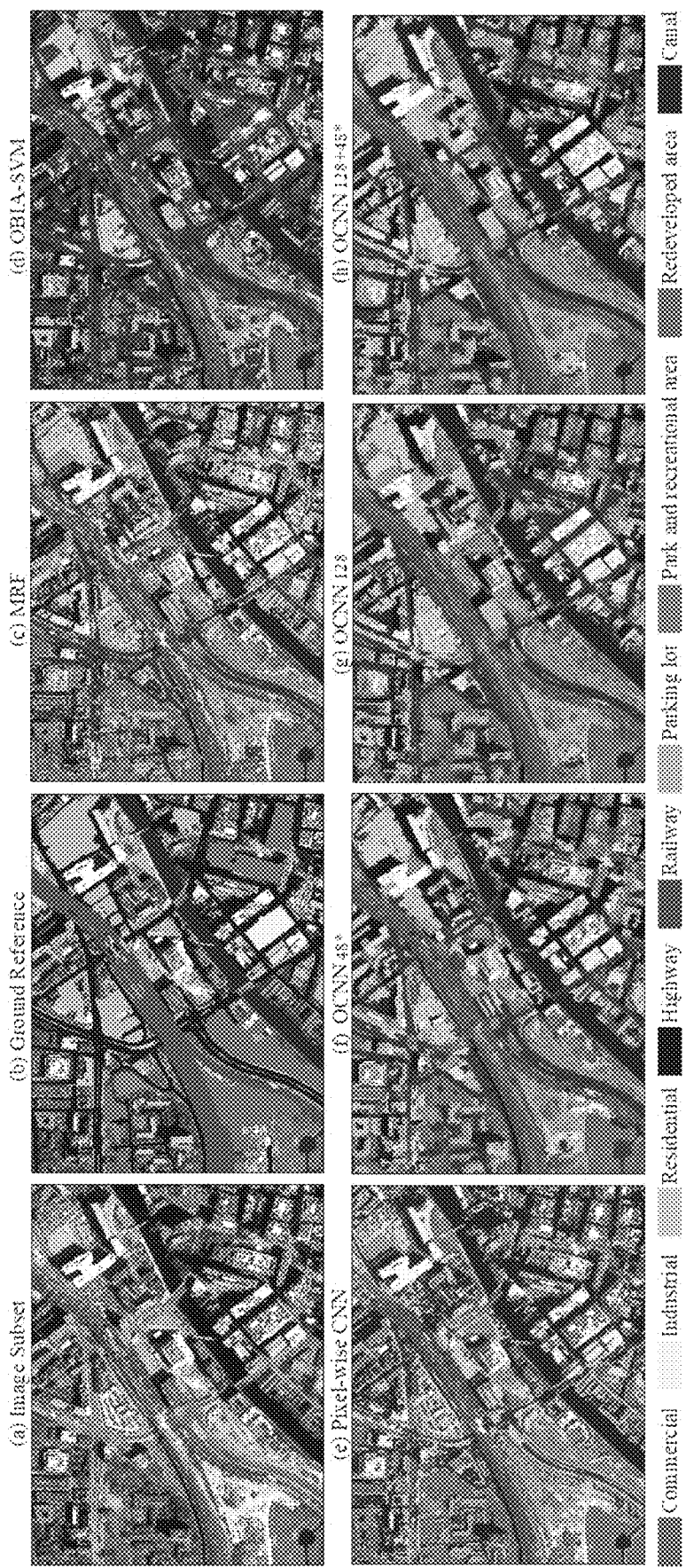

FIGS. 9 and 10 show some comparative land use classifications obtained by the present method and system compared against other already known land use classifiers. FIG. 9 shows three typical image subsets (a, b and c) in study site S1 with their classification results. Columns from left to right represent the original images (R G B bands only), and the MRF, OBIA-SVM, Pixel-wise CNN, OCNN48*, OCNN128, and the proposed OCNN128+48* results. The red and yellow circles denote incorrect and correct classification, respectively.

FIG. 10 shows classification results in study site S2, with (a) an image subset (R G B bands only), (b) the ground reference, (c) MRF classification, (d) OBIA-SVM classification, (e) pixel-wise CNN classification, (f) OCNN48* classification, (g) OCNN128 classification, and (h) OCNN128+48* classification. Moreover, to quantify the classification accuracy achieved by the OCNN128+48* classification of the present embodiment, the table in FIG. 12 gives the classification accuracy for area S2 using different classification techniques, but from which it can be seen that the OCNN128+48* method of the present embodiment achieves the greatest accuracy.

Please note that further results demonstrating the increased accuracy of the presently described technique, as well as further discussion of the concept, can be found in the inventors'-paper, Zhang, C. et al. *An object-based convolutional neural network (OCNN) for urban land use classification* Remote Sensing of Environment, vol 216, (2018) pp.57-70, the entire contents of which are hereby incorporated herein by reference.

Figure 11:
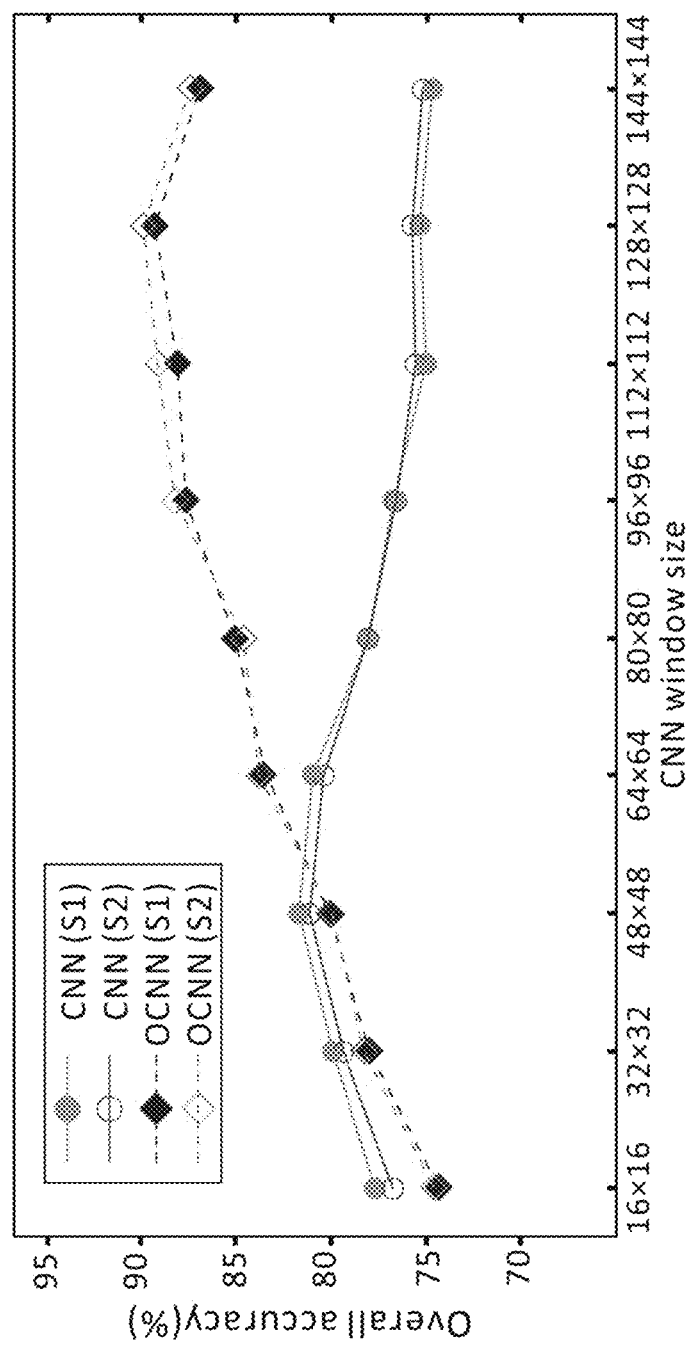
FIG. 11 is a graph showing the results of an experiment in window size on the operation of illustrative embodiments.

A sensitivity analysis was conducted to further investigate the effect of different input window sizes on the overall accuracy of urban land use classification (see FIG. 11). The window sizes varied from 16×16 to 144×144 with a step size of 16. From FIG. 11, it can be seen that both S1 and S2 demonstrated similar trends for the proposed OCNN and the Pixel-wise CNN (CNN). With window sizes smaller than 48×48 (i.e. relatively small windows), the classification accuracy of OCNN is lower than that of CNN, but the accuracy difference decreases with an increase of window size. Once the window size is larger than 48×48 (i.e. relatively large windows), the overall accuracy of the OCNN increases steadily until the window is as large as 128×128 (up to around 90%), and outperforms the CNN which has a generally decreasing trend in both study sites. However, an even larger window size (e.g. 144×144) in OCNN could result in over-smooth results, thus reducing the classification accuracy.

The object-based CNN (OCNN) method described herein is built upon segmented objects with spectrally homogeneous characteristics as the functional units, in which the precise boundary information is characterised at the object level. Unlike the standard pixel-wise CNN with image patches that are densely overlapping throughout the image, the OCNN method analyses and labels objects using CNN networks by incorporating the objects and their spatial context within image patches. This provides a new perspective for object description and feature characterisation, where both within-object information and between-object information are jointly learned inside the model. Since each segmented object is labelled with a single land use as a whole, the homogeneity of each object is crucial to achieving high land use classification accuracy. To produce a set of such objects with local homogeneity, a slight over-segmentation was adopted. In short, the OCNN method, as a combination of CNN and OBIA, demonstrates strong capacity for classifying complex urban land uses through deep feature representations, while maintaining the fine spatial details using regional partition and boundary delineation.

Each segmented object has its distinctive geometric characteristics with respect to the specific land use category. Representations of objects using OCNN should be scale-dependent with appropriate window sizes and convolutional positions to match the geometric distributions, especially when dealing with the two types of objects with geometrically distinctive characteristics, namely, general objects (G-objects) and linearly-shaped objects (LS-objects). For those G-objects with complex urban land use, a deep CNN network (eight-layers) with a large input image patch (128×128) was used to accurately identify an object with a large extent of contextual information. Such an image patch could reflect the real dimension of G-objects and their wide context (64 m×64 m in geographical space). The convolutional position of the CNN network was theoretically derived close to the central region of a moment box, where both object geometry and spatial anisotropy were characterised. In this way, the within-object (at the centre of the image patch) and between-object (surrounding context within the image patch) information are used simultaneously to learn the objects and the surrounding complex spatial structures or patterns, with the largest overall accuracy at large context (FIG. 11). The LS-objects, such as Highway, Railway and Canal, were sampled along the objects using a range of less deep CNNs (six-layers) with small window size (48×48) (or 24 m×24 m geographically) and were classified through majority voting. These small window size CNNs focus on the within object information, which often includes homogeneous characteristics within objects (e.g. rail tracks, asphalt road), and avoid the great variation between adjacent objects (e.g. trees, residential buildings, bare land etc. alongside the Highway). Moreover, the small contextual image patches with less deep networks cover the elongated objects sufficiently, without losing useful within-object information through the convolutional process. To integrate the two classification models for G-objects and LS-objects, a simple rule-based classification integration was employed conditional upon model predictions, in which the majority of the classification results were derived from the CNNs with large window size, whereas the predictions of Highway, Railway and Canal were trusted by the voting results of small window CNNs alone. Thus, the type of object (either as a G-object or a LS-object) is determined through CNN model predictions and rule-based classification integration. Such a decision fusion approach provides a pragmatic and effective manner to combine the two models by considering the object geometry and class-specific adaptations. Overall, the proposed OCNN method with large and small window size feature representations is a feasible solution for the complex urban land use classification problem using VFSR remotely sensed imagery, with massive generalisation capability for a broad range of applications.

Various further modifications, whether by way of addition, deletion, or substitution may be made to the above mentioned examples to provide further examples, any and all of which are intended to be encompassed by the appended claims.

What is claimed is:

1. A computer implemented method of classifying land use from remotely sensed imagery of land, comprising:
    receiving an input image of a patch of land;
    segmenting the input image into linearly shaped objects and non-linearly shaped objects;
    inputting the linearly shaped objects and non-linearly shaped objects into a first convolutional neural network trained with test images of predetermined land use types, and having a processing window size of a first size;
    inputting the linearly shaped objects and non-linearly shaped objects into a second convolutional neural network trained with test images of predetermined land use types, and having a plurality of processing windows of a second size smaller than the first size;
    determining land use classification data for the objects in both the first and second convolutional neural networks;
    receiving the land use classification data for the linearly shaped objects and the non-linearly shaped objects from both the first and second convolutional neural networks; and
    selecting a land use classification for a particular object from the land use classifications received from both the first and second convolutional neural networks in dependence on one or more predetermined classification fusion rules.

2. A method according to claim 1, wherein the predetermined classification fusion rules include:
    i) where the land use classification data from both the first and second convolutional neural networks match for a particular object, assigning that matching land use classification to the object, and
    ii) where the land use classification data from both the first and second convolutional neural networks do not match, selecting one of the land use classifications for the particular object in accordance with one or more predetermined criteria.

3. A method according to claim 2, wherein the predetermined criteria comprise:
    a) where an object is a linearly shaped object, assigning a majority land use classification from the land use classifications assigned to the plurality of processing windows by the second convolutional neural network; else
    b) for other objects assigning the land use classification determined by the first convolutional neural network.

4. A method according to claim 1, and further comprising after the object segmentation, determining for a segmented object respective object convolutional positions for use with both the first and second convolutional neural networks.

5. A method according to claim 4, wherein the determining the object convolutional positions includes finding a moment bounding box of each object, the moment bounding box being a minimum bounding rectangle surrounding an object and aligned with the orientation of the major axis of the object, the object convolutional positions being determined in dependence on properties of the bounding box.

6. A method according to claim 5, and further comprising using properties of the moment bounding box to determine, for an object, a single first object convolutional position which should be used to represent the object when being processed by the first neural network, and further to select, for the object, a plurality of second object convolutional positions distributed across the bounding box which should be used to represent the object when being processed by the second neural network.

7. A method according to claim 6, wherein the determining step comprises, for the particular segmented object, predicting the land use at the single first object convolutional position using the first neural network, and predicting the land use at the plurality of second object convolutional positions using the second neural network.

8. A method according to claim 1, and further comprising, prior to determining the land use classifications using the neural networks, training the first and second neural networks with images of land patches the land use classifications of which are known.

9. A method according to claim 1, wherein the linearly shaped objects include any highways, canals and railways present in the image patch.

10. A method according to claim 1, and further comprising generating an output image corresponding to the input image, the output image comprising the image of the patch of land visually augmented to indicate the selected land use classification determined for each object in the image.

11. A method according to claim 10, wherein the visual augmentation comprises overlaying a color wash on o the segmented objects in the image, the overlaid color being selected in accordance with a predetermined color mapping of color to land use classification.

12. A system, comprising:
    one or more processors;
    an input and output interface for receiving data and outputting data; and
    a computer readable medium storing computer readable instructions arranged such that when executed they cause the system to determine land use from remotely sensed imagery of land, the determining comprising:
    receiving an input image of a patch of land;
    segmenting the input image into linearly shaped objects and non-linearly shaped objects;
    inputting the linearly shaped objects and non-linearly shaped objects into a first convolutional neural network trained with test images of predetermined land use types, and having a processing window size of a first size;
    inputting the linearly shaped objects and non-linearly shaped objects into a second convolutional neural network trained with test images of predetermined land use types, and having a plurality of processing windows of a second size smaller than the first size;
    determining land use classification data for the objects in both the first and second convolutional neural networks;
    receiving the land use classification data for the linearly shaped objects and the non-linearly shaped objects from both the first and second convolutional neural networks; and
    selecting a land use classification for a particular object from the land use classifications received from both the first and second convolutional neural networks in dependence on one or more predetermined classification fusion rules.

13. A system according to claim 12, wherein the predetermined classification fusion rules include:
   i) where the land use classification data from both the first and second convolutional neural networks match for a particular object, assigning that matching land use classification to the object, and
   ii) where the land use classification data from both the first and second convolutional neural networks do not match, selecting one of the land use classifications for the particular object in accordance with one or more predetermined criteria.

14. A system according to claim 12, and further comprising after the object segmentation, determining for a segmented object respective object convolutional positions for use with both the first and second convolutional neural networks.

15. A system according to claim 14, wherein the determining the object convolutional positions includes finding a moment bounding box of each object, the moment bounding box being a minimum bounding rectangle surrounding an object and aligned with the orientation of the major axis of the object, the object convolutional positions being determined in dependence on properties of the bounding box.

16. A system according to claim 15, and further comprising using properties of the moment bounding box to determine, for an object, a single first object convolutional position which should be used to represent the object when being processed by the first neural network, and further to select, for the object, a plurality of second object convolutional positions distributed across the bounding box which should be used to represent the object when being processed by the second neural network.

17. A system according to claim 12, and further comprising, prior to determining the land use classifications using the neural networks, training the first and second neural networks with images of land patches the land use classifications of which are known.

18. A system according to claim 12, wherein the linearly shaped objects include any highways, canals and railways present in the image patch.

19. A system according to claim 12, and further comprising generating an output image corresponding to the input image, the output image comprising the image of the patch of land visually augmented to indicate the selected land use classification determined for each object in the image.

20. A system according to claim 19, wherein the visual augmentation comprises overlaying a color wash on o the segmented objects in the image, the overlaid color being selected in accordance with a predetermined color mapping of color to land use classification.

\* \* \* \* \*